(12) United States Patent
Okada et al.

(10) Patent No.: US 10,615,951 B2
(45) Date of Patent: Apr. 7, 2020

(54) TRANSMISSION APPARATUS, RECEPTION APPARATUS, AND DATA PROCESSING METHOD

(71) Applicant: SONY SEMICONDUCTOR SOLUTIONS CORPORATION, Atsugi-shi (JP)

(72) Inventors: Satoshi Okada, Tokyo (JP); Kazuyuki Takahashi, Chiba (JP); Lachlan Bruce Michael, Saitama (JP)

(73) Assignee: SONY SEMICONDUCTOR SOLUTIONS CORPORATION, Atsugi-shi (JP)

( * ) Notice: Subject to any disclaimer, the term of this patent is extended or adjusted under 35 U.S.C. 154(b) by 0 days.

(21) Appl. No.: 16/099,722

(22) PCT Filed: Jun. 23, 2017

(86) PCT No.: PCT/JP2017/023149
§ 371 (c)(1),
(2) Date: Nov. 8, 2018

(87) PCT Pub. No.: WO2018/008429
PCT Pub. Date: Jan. 11, 2018

(65) Prior Publication Data
US 2019/0190689 A1    Jun. 20, 2019

(30) Foreign Application Priority Data

Jul. 8, 2016    (JP) .................................. 2016-135712

(51) Int. Cl.
*H04L 7/00* (2006.01)
*H04N 21/236* (2011.01)
(Continued)

(52) U.S. Cl.
CPC .............. *H04L 7/0008* (2013.01); *H04L 7/00* (2013.01); *H04L 7/0091* (2013.01);
(Continued)

(58) Field of Classification Search
CPC ....... H04L 7/0008; H04L 7/0091; H04L 7/00; H04N 21/64322; H04N 21/434; H04N 21/236
(Continued)

(56) References Cited

U.S. PATENT DOCUMENTS

2005/0255862 A1* 11/2005 Jung .................. H04W 72/005
455/456.2
2007/0133490 A1* 6/2007 Kwon ............... H04W 74/0825
370/338
(Continued)

FOREIGN PATENT DOCUMENTS

JP          2015-70609 A      4/2015
JP          2015-95898 A      5/2015
(Continued)

OTHER PUBLICATIONS

International Search Report dated Sep. 19, 2017 in PCT/JP2017/023149, 2 pages.
(Continued)

*Primary Examiner* — Don N Vo
(74) *Attorney, Agent, or Firm* — Oblon, McClelland, Maier & Neustadt, L.L.P.

(57) ABSTRACT

The present technology relates to a transmission apparatus, a reception apparatus, and a data processing method capable of efficiently transmitting time information with high accuracy.

The transmission apparatus generates a physical layer frame including the time information and transmits the physical layer frame. The reception apparatus receives the physical layer frame from the transmission apparatus and performs predetermined processing on the basis of the time information included in the physical layer frame. Time information indicating a certain time is included at a head of the physical layer frame. The present technology can be applied to digital television broadcasting using the IP system.

17 Claims, 14 Drawing Sheets

(51) Int. Cl.
*H04N 21/434* (2011.01)
*H04N 21/643* (2011.01)

(52) U.S. Cl.
CPC ......... *H04N 21/236* (2013.01); *H04N 21/434* (2013.01); *H04N 21/64322* (2013.01)

(58) Field of Classification Search
USPC ........................................................ 375/355
See application file for complete search history.

(56) References Cited

U.S. PATENT DOCUMENTS

| | | | |
|---|---|---|---|
| 2008/0025249 A1* | 1/2008 | Kuppuswamy | H04B 7/18567 370/325 |
| 2011/0069697 A1* | 3/2011 | Sim | H04W 16/14 370/350 |
| 2016/0205441 A1 | 7/2016 | Iguchi et al. | |
| 2016/0241925 A1 | 8/2016 | Iguchi et al. | |
| 2016/0261358 A1 | 9/2016 | Iguchi et al. | |
| 2017/0318518 A1* | 11/2017 | Kim | H04W 74/002 |
| 2018/0249224 A1 | 8/2018 | Iguchi et al. | |

FOREIGN PATENT DOCUMENTS

| | | |
|---|---|---|
| JP | 2015-104122 A | 6/2015 |
| WO | WO 2016/098601 A1 | 6/2016 |
| WO | WO 2017/098950 A1 | 6/2017 |

OTHER PUBLICATIONS

"Transmission System for Digital Terrestrial Television Broadcasting", ARIB Standard, ARIB STD-B31, 2.2, Mar. 18, 2014, (with English Translation), 419 pages.

Extended European Search Report dated Apr. 12, 2019 in corresponding European Patent Application No. 17824036.2, 7 pages.

* cited by examiner

FIG. 9

| DATA STRUCTURE | NUMBER OF BITS | DATA NOTATION |
|---|---|---|
| Network_Time_Protocol_Data() { | | |
|   leap_indicator | 2 | uimsbf |
|   version | 3 | uimsbf |
|   mode | 3 | uimsbf |
|   stratum | 8 | uimsbf |
|   poll | 8 | simsbf |
|   precision | 8 | simsbf |
|   root_delay | 32 | uimsbf |
|   root_dispersion | 32 | uimsbf |
|   reference_identification | 32 | uimsbf |
|   reference_timestamp | 64 | uimsbf |
|   origin_timestamp | 64 | uimsbf |
|   receive_timestamp | 64 | uimsbf |
|   transmit_timestamp | 64 | uimsbf |
| } | | |

FIG. 12

| Syntax | No of Bits | Mnemonic | Semantics |
|---|---|---|---|
| NTP_FLAG | 1 | bslbf | FLAG INDICATING INCLUSION OF TIME INFORMATION |
| if(NTP_FLAG) { | | | |
|   leap_indicator | 2 | uimsbf | INDICATING LEAP SECOND IS INSERTED OR DELETED TO/FROM LAST ONE MINUTE OF CURRENT MONTH |
|   transmit_timestamp | 64 | uimsbf | INDICATING SERVER TIME IN NTP LENGTH FORMAT |
| } | | | |

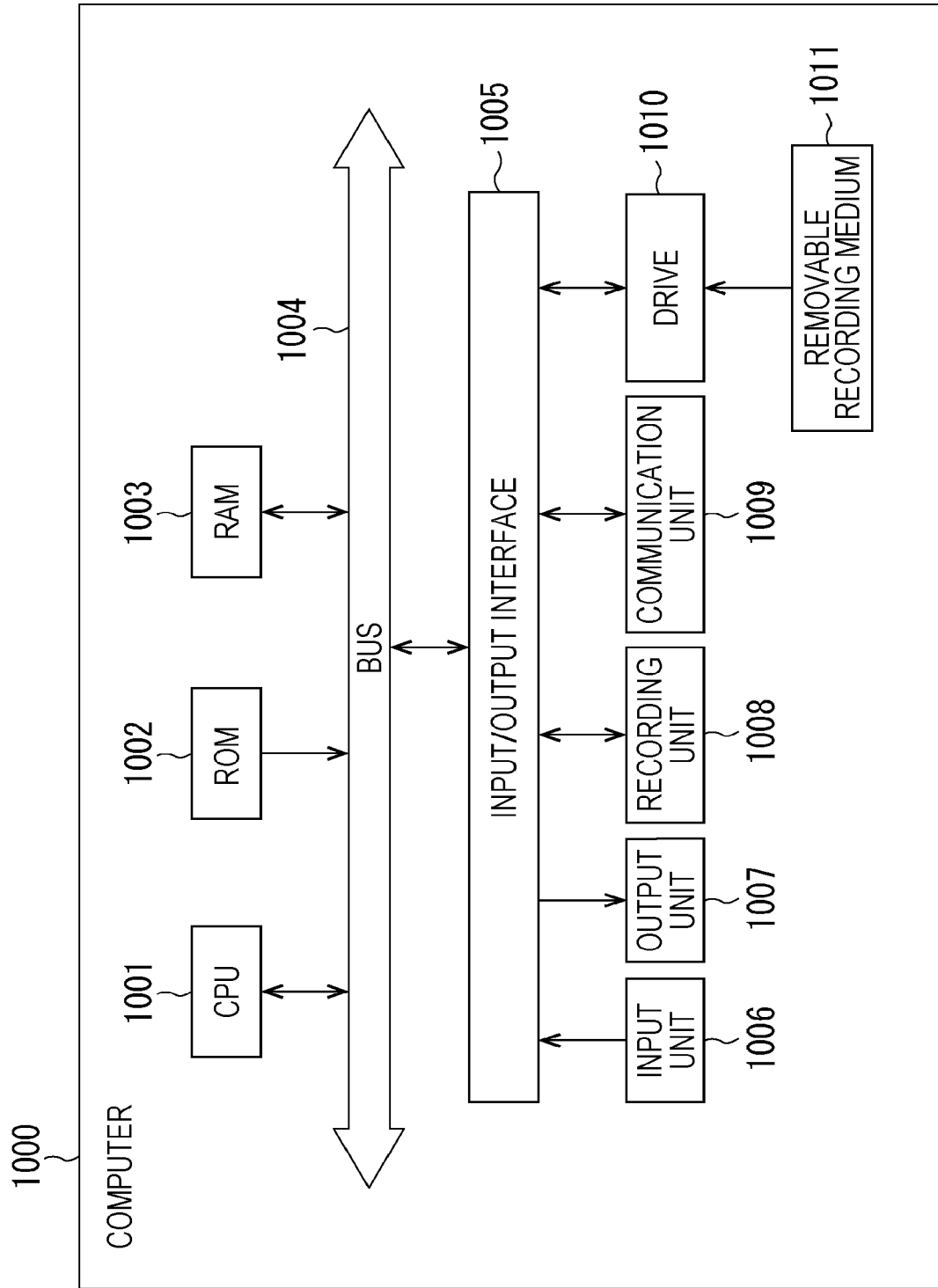

TRANSMISSION APPARATUS, RECEPTION APPARATUS, AND DATA PROCESSING METHOD

TECHNICAL FIELD

The present technology relates to a transmission apparatus, a reception apparatus, and a data processing method and particularly relates to a transmission apparatus, a reception apparatus, and a data processing method capable of efficiently transmitting time information with high accuracy.

BACKGROUND ART

It is known that broadcasting systems of digital television broadcasting use a program clock reference (PCR) as time information to achieve synchronization between the transmitting side and the receiving side (for example, refer to Non-Patent Document 1).

CITATION LIST

Non-Patent Document

Non-Patent Document 1: ARIB standards STD-B 31 Version 2.2 Association of Radio Industries and Businesses

SUMMARY OF THE INVENTION

Problems to be Solved by the Invention

Meanwhile, there are proposals, in the broadcasting systems of digital television broadcasting, for achieving highly accurate and efficient transmission of time information used for synchronization between the transmitting side and the receiving side.

The present technology has been made in view of this situation, and aims to enable highly accurate and efficient transmission of time information.

Solutions to Problems

A transmission apparatus according to a first aspect of the present technology includes: a generation unit that generates a physical layer frame; and a transmission unit that transmits the physical layer frame, in which time information indicating a certain time is included at a head of the physical layer frame.

The transmission apparatus according to the first aspect of the present technology may be an independent apparatus or may be an internal block forming one apparatus. Moreover, a data processing method according to the first aspect of the present technology is a data processing method corresponding to a transmission apparatus according to the first aspect of the present technology described above.

With the use of the transmission apparatus and the data processing method according to the first aspect of the present technology, a physical layer frame is generated and the physical layer frame is transmitted. In addition, time information indicating a certain time is included at the head of the physical layer frame.

A reception apparatus according to a second aspect of the present technology includes: a reception unit that receives a physical layer frame including time information; and a processing unit that performs predetermined processing on the basis of the time information, in which the time information indicating a certain time is included at a head of the physical layer frame.

A reception apparatus according to the second aspect of the present technology may be an independent apparatus or an internal block forming one apparatus. Furthermore, a data processing method according to the second aspect of the present technology is a data processing method corresponding to a reception apparatus according to the second aspect of the present technology described above.

With the use of the reception apparatus and the data processing method according to the second aspect of the present technology, a physical layer frame including time information is received, and predetermined processing is performed on the basis of the time information. In addition, time information indicating a certain time is included at the head of the physical layer frame.

Effects of the Invention

According to the first aspect and the second aspect of the present technology, time information can be transmitted efficiently with high accuracy, leading to execution of clock synchronization (clock recovery) with high accuracy in the reception apparatus.

Note that effects described herein are non-restricting. The effects may be any of effects described in the present disclosure.

BRIEF DESCRIPTION OF DRAWINGS

FIG. 9 is a diagram illustrating a data structure of time information in the NTP format.

FIG. 12 is a diagram illustrating an example of syntax of NTP time information.

FIG. 14 is a diagram illustrating a configuration example of a computer.

MODE FOR CARRYING OUT THE INVENTION

Figure 1:
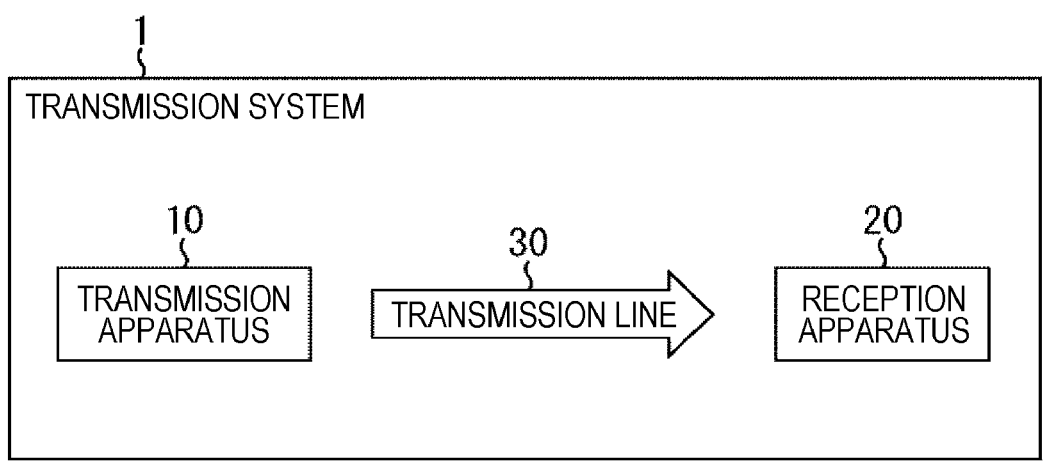
FIG. 1 is a diagram illustrating a configuration a transmission system according to an embodiment of the present technology.

Hereinafter, embodiments of the present technology will be described with reference to the drawings. Note that the description will be given in the following order.

1. System configuration
2. Outline of the present technology
3. Time information transmission timing of the present technology
   (A) Case of single hierarchical layer
   (B) Case of plurality of hierarchical layers
4. Syntax of time information of the present technology
5. Flow of time synchronization processing
6. Modification
7. Configuration of computer <1. System Configuration>

(Exemplary Configuration of Transmission System)

FIG. 1 is a diagram illustrating a configuration a transmission system according to an embodiment of the present technology. Note that the term "system" represents a logical set of a plurality of apparatuses.

In FIG. 1, a transmission system 1 includes a transmission apparatus 10 and a reception apparatus 20. The transmission system 1 performs data transmission conforming to a predetermined broadcasting system.

The transmission apparatus 10 is a transmitter compatible with a predetermined broadcasting system and transmits content via a transmission line 30. For example, the transmission apparatus 10 transmits, as a broadcast wave, a broadcast stream containing data of video, audio, and subtitles of the content such as a broadcast program, and containing control information, via the transmission line 30.

The reception apparatus 20 is a receiver compatible with a predetermined broadcasting system and receives and outputs content transmitted from the transmission apparatus 10 via the transmission line 30. For example, the reception apparatus 20 receives the broadcast wave from the transmission apparatus 10 and processes the data of video, audio, subtitle and control information contained in the broadcast stream so as to reproduce the video and audio of the content such as the broadcast program.

Note that the transmission system 1 may use the transmission line 30 of a terrestrial channel (terrestrial broadcast), and other broadcast such as a satellite broadcasting using a broadcasting satellite (BS), a communications satellite (CS), or a cable broadcast (CATV) using a cable, for example.

(Exemplary Configuration of Transmission Apparatus)

Figure 2:
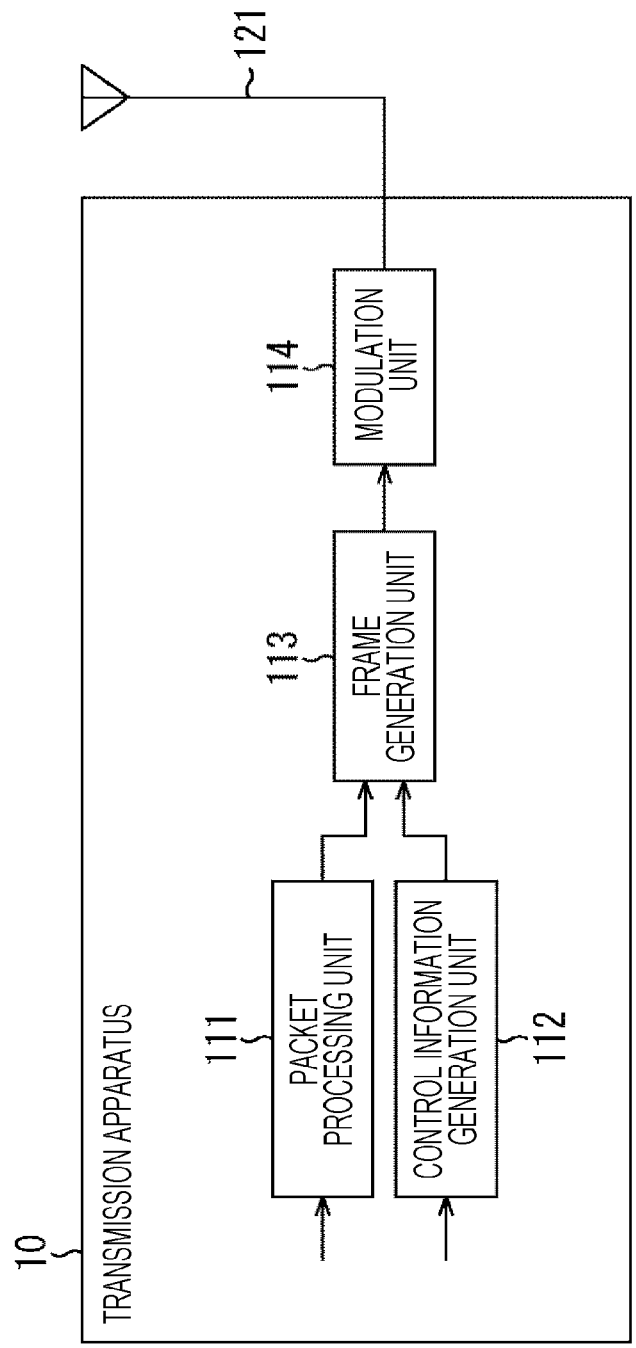
FIG. 2 is a diagram illustrating an exemplary configuration of a transmission apparatus.

FIG. 2 is a diagram illustrating an exemplary configuration of the transmission apparatus 10 in FIG. 1.

Referring to FIG. 2, the transmission apparatus 10 includes a packet processing unit 111, a control information generation unit 112, a frame generation unit 113, and a modulation unit 114.

The packet processing unit 111 processes a packet storing data such as video, audio, and subtitles of the content, and supplies the processed packet to the frame generation unit 113. Furthermore, the packet processing unit 111 can include the time information in the packet.

The control information generation unit 112 generates control information used to perform demodulation processing, decoding processing, or the like, on the receiving side, and supplies the generated control information to the frame generation unit 113.

The frame generation unit 113 processes the packet supplied from the packet processing unit 111 and the control information supplied from the control information generation unit 112 so as to generate a frame of a physical layer (physical layer frame) conforming to a predetermined broadcasting system, and supplies the generated frame to the modulation unit 114.

The modulation unit 114 performs necessary processing (modulation processing) on the physical layer frame supplied from the frame generation unit 113, and transmits a resultant broadcast signal via an antenna 121.

The transmission apparatus 10 is configured as described above. Note that although FIG. 2 illustrates the transmission apparatus 10 constituted with a single device for the sake of convenience of description, the transmission apparatus 10 on the transmitting side may be a system having a plurality of devices including individual functions of the blocks in FIG. 2.

(Exemplary Configuration of Reception Apparatus)

Figure 3:
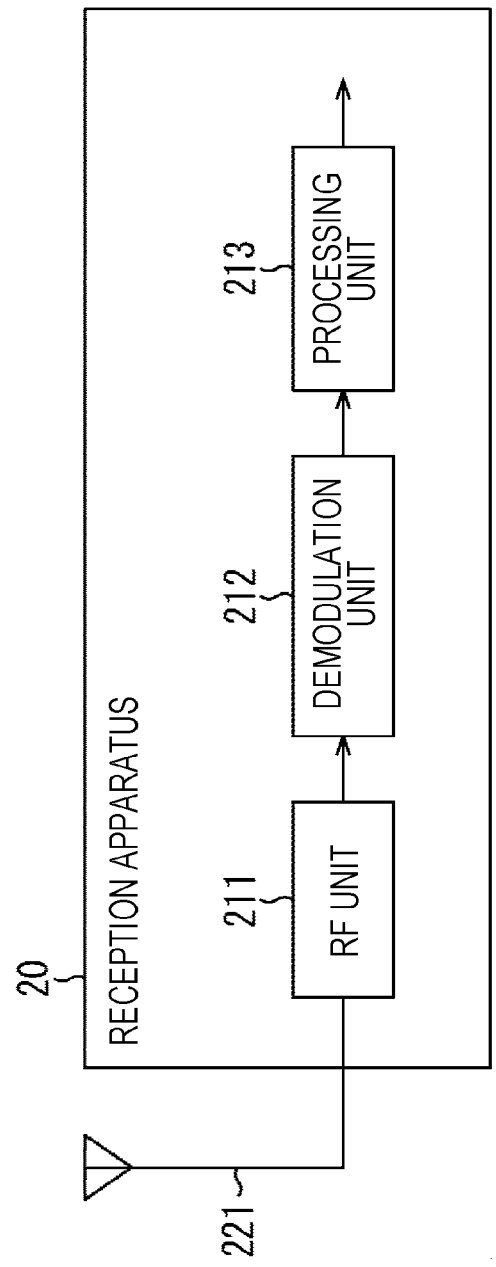
FIG. 3 is a diagram illustrating an exemplary configuration of a reception apparatus.

FIG. 3 is a diagram illustrating an exemplary configuration of the reception apparatus 20 of FIG. 1.

In FIG. 3, the reception apparatus 20 includes an RF unit 211, a demodulation unit 212, and a processing unit 213.

The RF unit 211 includes a tuner and the like, for example. The RF unit 211 performs necessary processing on the broadcast signal received via the antenna 221, and supplies a resultant signal to the demodulation unit 212.

The demodulation unit 212 includes demodulation large scale integration (LSI) and the like, for example. The demodulation unit 212 performs demodulation processing on the signal supplied from the RF unit 211. This demodulation processing processes the physical layer frame in accordance with the control information so as to obtain a packet, for example. The packet obtained in the demodulation processing is supplied to the processing unit 213.

The processing unit 213 includes a main System on Chip (SoC) and the like, for example. The processing unit 213 performs predetermined processing on the packet supplied from the demodulation unit 212. Here, for example, the time information is processed together with the packet, and clock synchronization (clock recovery) is performed.

Data such as video, audio and subtitles obtained by the processing performed by the processing unit 213 undergo decoding processing or the like in a circuit in a subsequent stage, and the resultant video and audio are output. With this processing, content such as a broadcast program is reproduced and the video and audio are output in the reception apparatus 20.

The reception apparatus 20 is configured as described above. Note that the reception apparatus 20 is configured, for example, as a fixed receiver such as a television receiver or a set top box (STB) or as a mobile receiver including a tuner, such as a mobile phone or a smartphone. In addition, the reception apparatus 20 may be an in-vehicle device mounted on the vehicle.

<2. Outline of Present Technology>

Meanwhile, Integrated Services Digital Broadcasting-Terrestrial (ISDB-T) is a broadcasting system adopted by Japan or the like as a terrestrial digital television broadcasting system (for example, refer to the above-described Non-Patent Document 1).

ISDB-T mainly defines High Definition television (Hi-vision) broadcasting using 12 segments for fixed receivers and a "one segment partial reception service for cellular phones and mobile terminals" (1-seg broadcasting) as broadcasting using a single segment and provided mainly for mobile receivers.

In addition to this, Japan has started examination toward enhanced next generation terrestrial digital television broadcasting (hereinafter, the standard under examination for enhancement will be also referred to as "ISDB-T2").

While the current ISDB-T adopts the MPEG2 transport stream (MPEG2-TS) system being widely used as a transmission system, the next generation ISDB-T2 is expected to provide more enhanced services by introducing an IP system that applies Internet Protocol (IP) packets currently used in the field of communication to digital television broadcasting so as to achieve linkage between broadcasting and communication.

(Comparison of Protocol Stack of Current Method and Next Generation Method)

Figure 4:
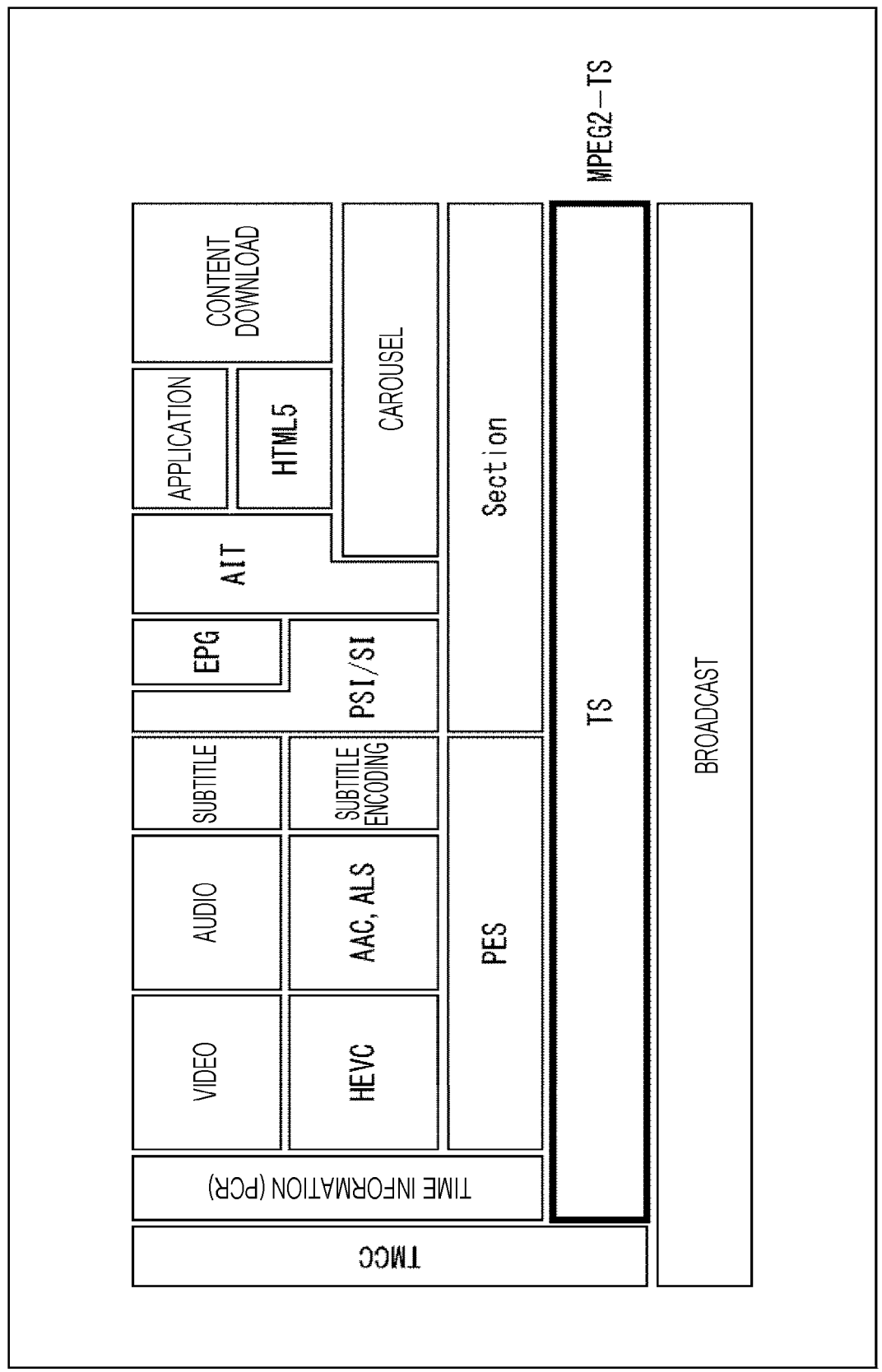
FIG. 4 is a diagram illustrating a protocol stack of an MPEG2-TS system.

FIG. 4 illustrates an example of a protocol stack in the current MPEG 2-TS system. In FIG. 4, "TS" represents MPEG2-TS. A stream including multiplexed data such as video and audio, subtitle, time information (PCR), control information (PSI/SI), an electronic program guide (EPG), applications, and content is transmitted as a broadcast wave.

Figure 5:
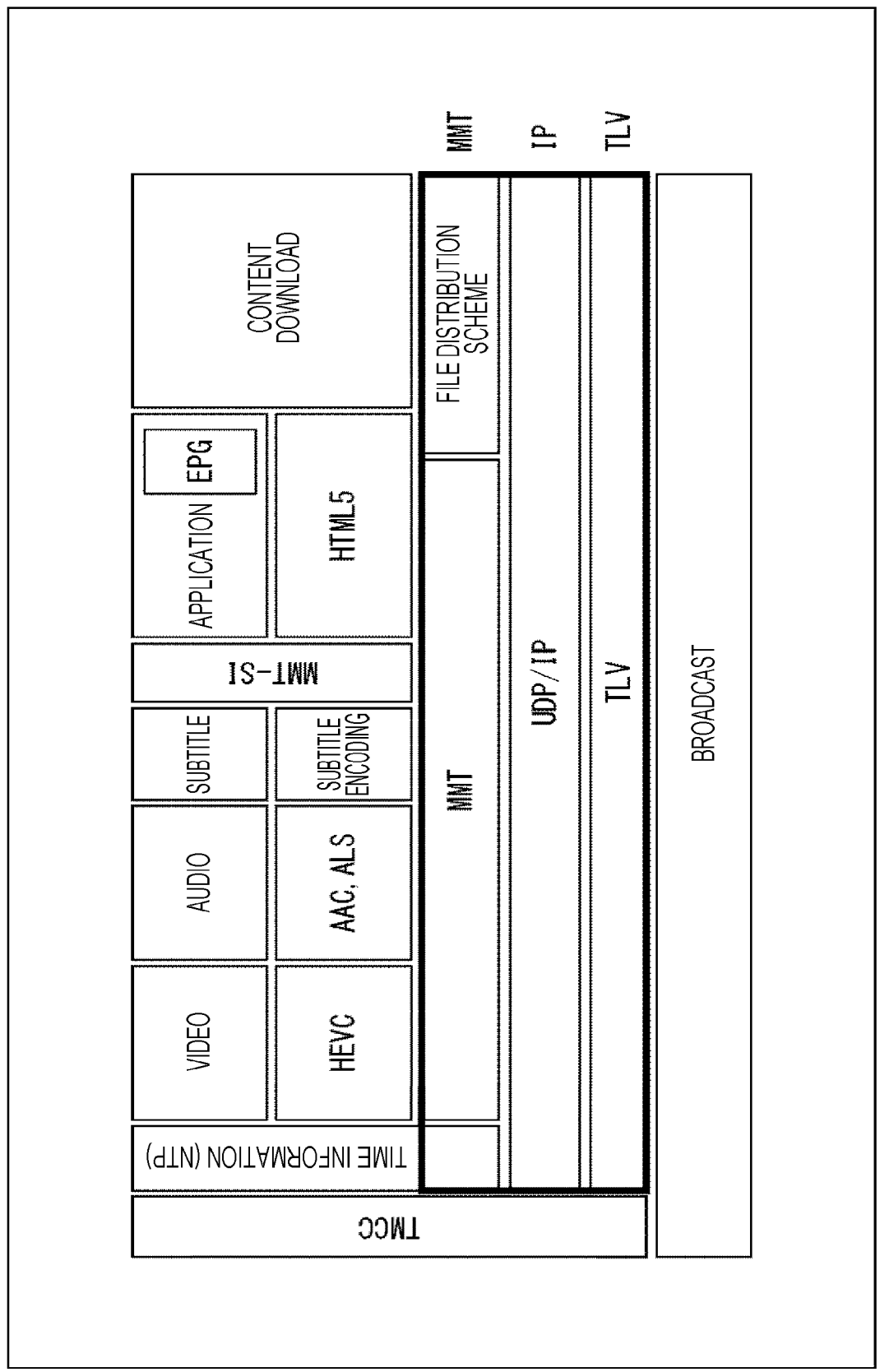
FIG. 5 is a diagram illustrating a protocol stack of an IP system.

FIG. 5 illustrates an example of a protocol stack of the next generation IP system. In FIG. 5, "TLV" represents a type length value (TLV) packet. A TLV packet is a variable length packet and stores an IP packet. Furthermore, "MMT" is an abbreviation of MPEG Media Transport and is a media transport system for transmitting multimedia content using various networks such as broadcasting and communication.

With the use of the MMT, data such as video, audio, subtitles, control information (MMT-SI), applications, content are stored in IP packets, and the IP packets are further encapsulated in TLV packets, and a resultant TLV stream is transmitted as a broadcast wave. Furthermore, an IP packet containing time information (NTP) is also stored in a TLV packet and transmitted as a TLV stream.

(Comparison of Time Information of Current System and Next Generation System)

As illustrated in the above protocol stack, the current MPEG 2-TS system uses PCR as time information. Furthermore, the next generation IP system is assumed to use time information of the Network Time Protocol (NTP) format as time information.

Figure 6:
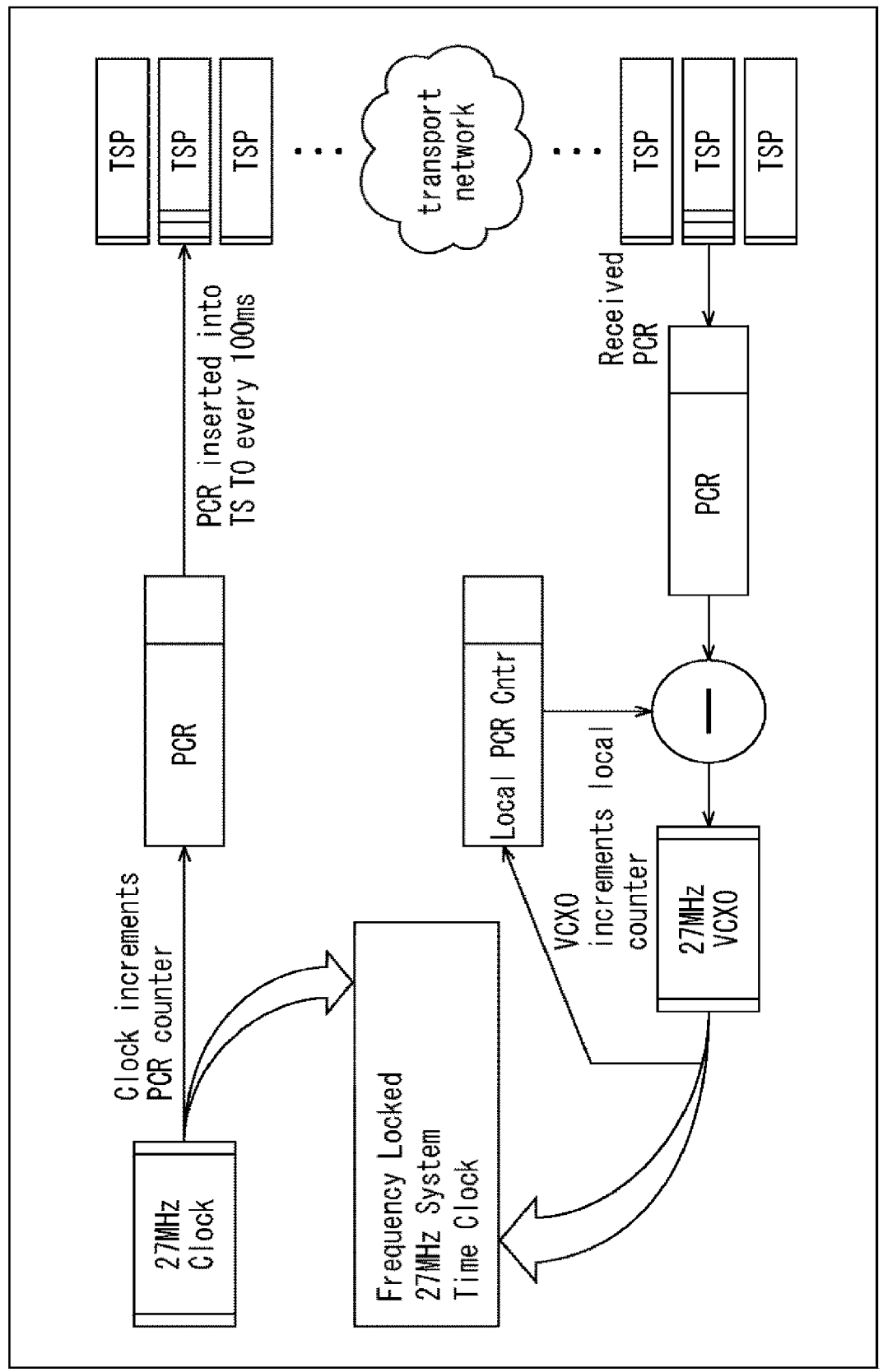
FIG. 6 is a diagram illustrating clock synchronization between a transmitting side and a receiving side using PCR.

FIG. 6 is a diagram illustrating clock synchronization on the transmitting side and the receiving side using PCR in the current MPEG2-TS system. In FIG. 6, the transmitting side transmits a clock counter value of 27 MHz as PCR to be included in a TS packet to the receiving side at predetermined intervals. On the other hand, the receiving side detects the PCR included in the TS packet, compares the value of the PCR with a count value counted by the system time clock (STC) obtained from the 27 MHz voltage controlled crystal oscillator (VCXO), and feeds back a difference to the VCXO to adjust the frequency of the STC clock output by the VCXO, thereby achieving synchronization of the clock on the transmitting side with the clock on the receiving side.

The PCR used in clock synchronization in this manner is transmitted on the MPEG2-TS, and thus would not be used in the next generation IP system. Accordingly, a time information transmission system conforming to the TLV packet would be necessary. For example, ISDB-S3 is a broadcasting system of next generation satellite digital television broadcasting (refer to Non-Patent Document 2, for example).

Non-Patent Document 2: ARIB standards STD-B44 Version 2.1 Association of Radio Industries and Businesses ISDB-S3 defines a time information transmission system using TLV packets, in which IP packets including time information in the NTP format are stored in the TLV packet. Network time protocol (NTP) is a communication protocol used for synchronizing the clock of the device connected to a network, with the correct time.

Figure 7:
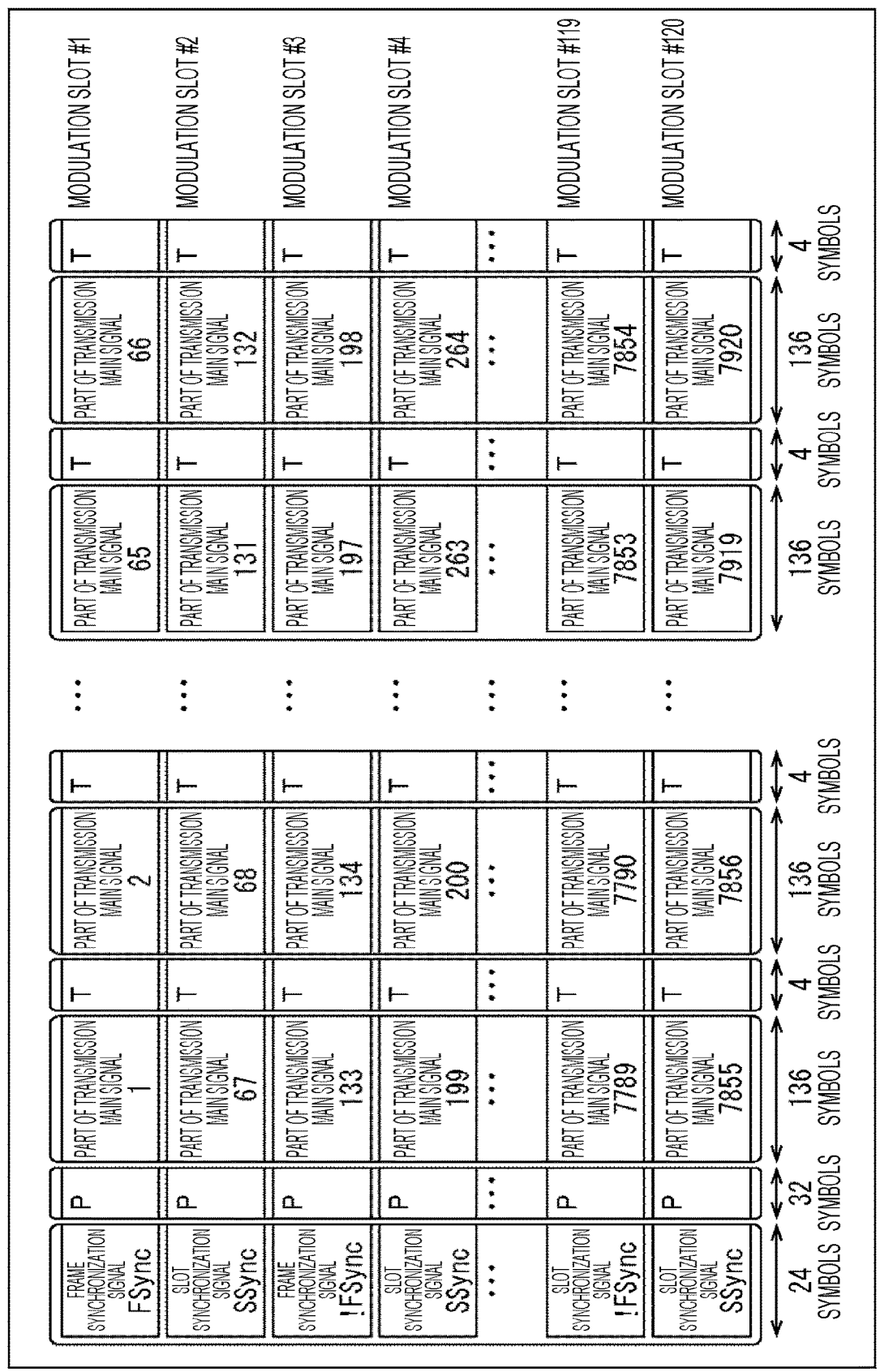
FIG. 7 is a diagram illustrating a frame structure of ISDB-S3.

Here, with reference to FIGS. 7 and 8, the transmission timing of the TLV packet storing the IP packet including the time information of the NTP format in the ISDB-S3 will be described. FIG. 7 illustrates a frame structure of ISDB-S3. Details of the frame structure are described in "3.3 Frame structure of modulation signal" in the above-described Non-Patent Document 2, in which a transmission main signal, which is a signal generated in units of slots, is transmitted for each of modulation slots.

Figure 8:
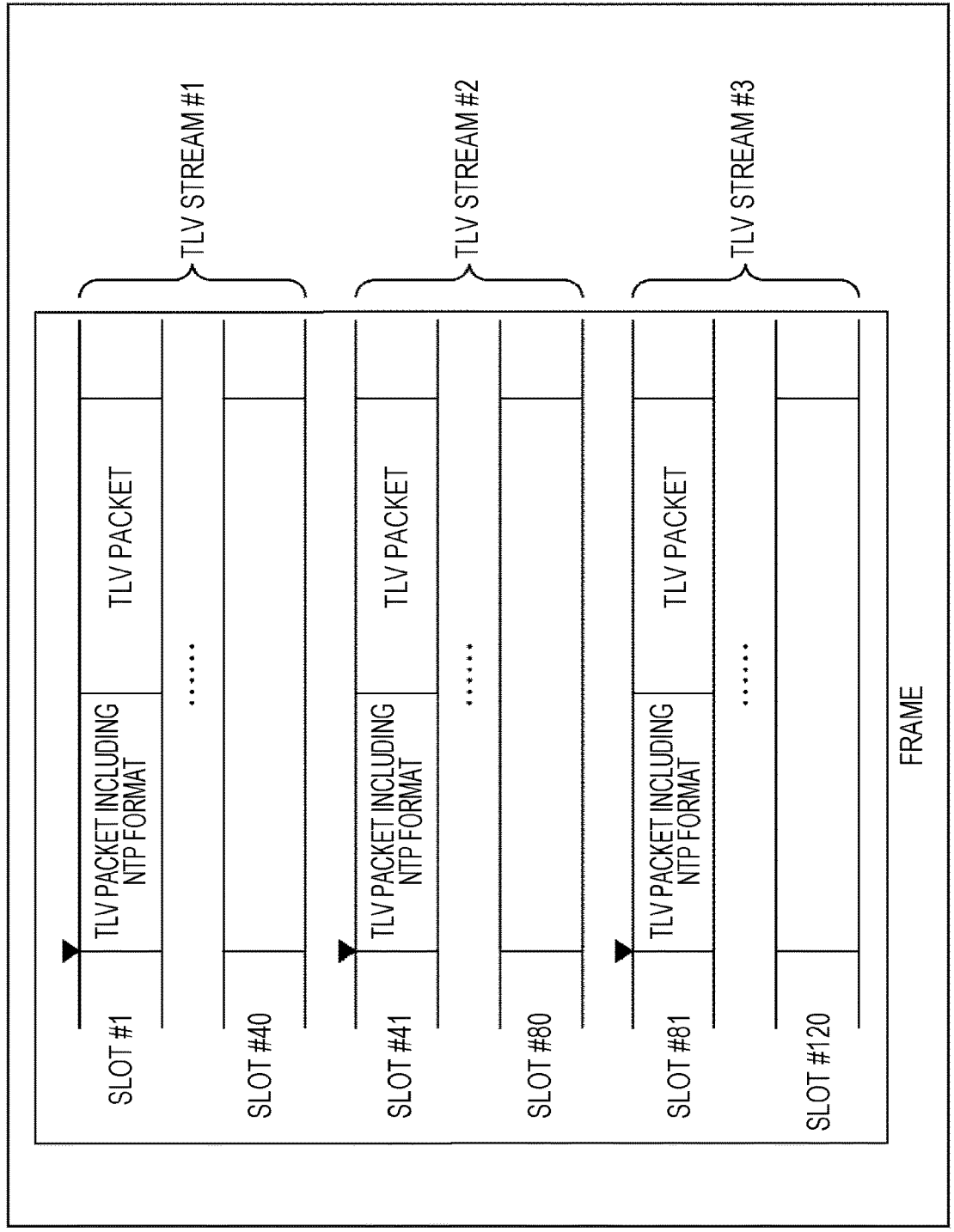
FIG. 8 is a diagram illustrating transmission timings of time information in an NTP format of ISDB-S3.

Furthermore, FIG. 8 illustrates an example of assignment of TLV packets storing IP packets including time information of NTP format. The arrangement example of this TLV packet is described in detail in "3.1 Transmission of Coordinated Universal Time by NTP in main signal" in the above-described Non-Patent Document 2. For example, in a case where one frame is used for three TLV streams, a TLV packet storing an IP packet including time information in the NTP format is placed at the head of the first slot (for example, slot #1, slot #41, or slot #81) among the slots allocated for each of the TLV stream IDs.

Note that FIG. 9 illustrates an example of the data structure of the time information in the NTP format. Details of the data structure are described in "3.1 Configuration of NTP format" of Non-Patent Document 3 below. Therefore, although the detailed explanation is omitted here, the time of a server at which the response to a client has been transmitted is designated as a transmission timestamp in the NTP length format in 64-bit transmit_timestamp. Note that the NTP length format is configured with a 32-bit field indicating units of seconds and a 32-bit field indicating one second or less.

Non-Patent Document 3: ARIB standards STD-B60 Version 1.6 Association of Radio Industries and Businesses As described above, the current broadcasting system has already defined a transmission system for transmitting time information to achieve synchronization between the transmitting side and the receiving side. However, in order to achieve enhancement for the next generation terrestrial digital television broadcasting, it is necessary to separately formulate a time information transmission system, leading to demands for a proposal to achieve time information transmission efficiently with high accuracy.

In order to cope with this demand, the present technology aims to enable transmission of time information with high accuracy and efficiency corresponding to the enhancement for the next generation terrestrial digital television broadcasting. In other words, the present technology is configured such that time information indicating the time (certain time) at the head of the physical layer frame is included at the head of a physical layer frame so as to enable transmission of the time information with high accuracy and efficiency.

Hereinafter, the transmission of time information according to the present technology will be described. In the following description, a frame of the physical layer in the next generation terrestrial digital television broadcasting according to the present technology will be referred to as an ISDB-T2 frame. Furthermore, an exemplary case in which time information defined by NTP (hereinafter also referred to as NTP time information) is used as the time information will be described.

<3. Timing of Transmitting Time Information of the Present Technology>

In the current ISDB-T, a frequency division multiplexing (FDM) method is adopted as a method of multiplexing broadcast signals. The frequency division multiplexing (FDM) method is assumed to be adopted similarly in the next generation ISDB-T2.

In a case where this frequency division multiplexing (FDM) method is adopted, a predetermined frequency band (for example, 6 MHz) is frequency-divided into a plurality of segments, and transmission of hierarchical layers is performed using the band for one or more segments. In this case, data of different services, for example, can be transmitted for each of hierarchical layers of frequency bands of one or more segments obtained by frequency division.

That is, each of hierarchical layers is a unit of one or more segments. Note that ISDB-T uses OFDM segments. Here, in this orthogonal frequency division multiplexing (OFDM), a large number of orthogonal subcarriers (sub carriers) are provided in the transmission band and digital modulation is performed.

(A) Case of Single Hierarchical Layer

Figure 10:
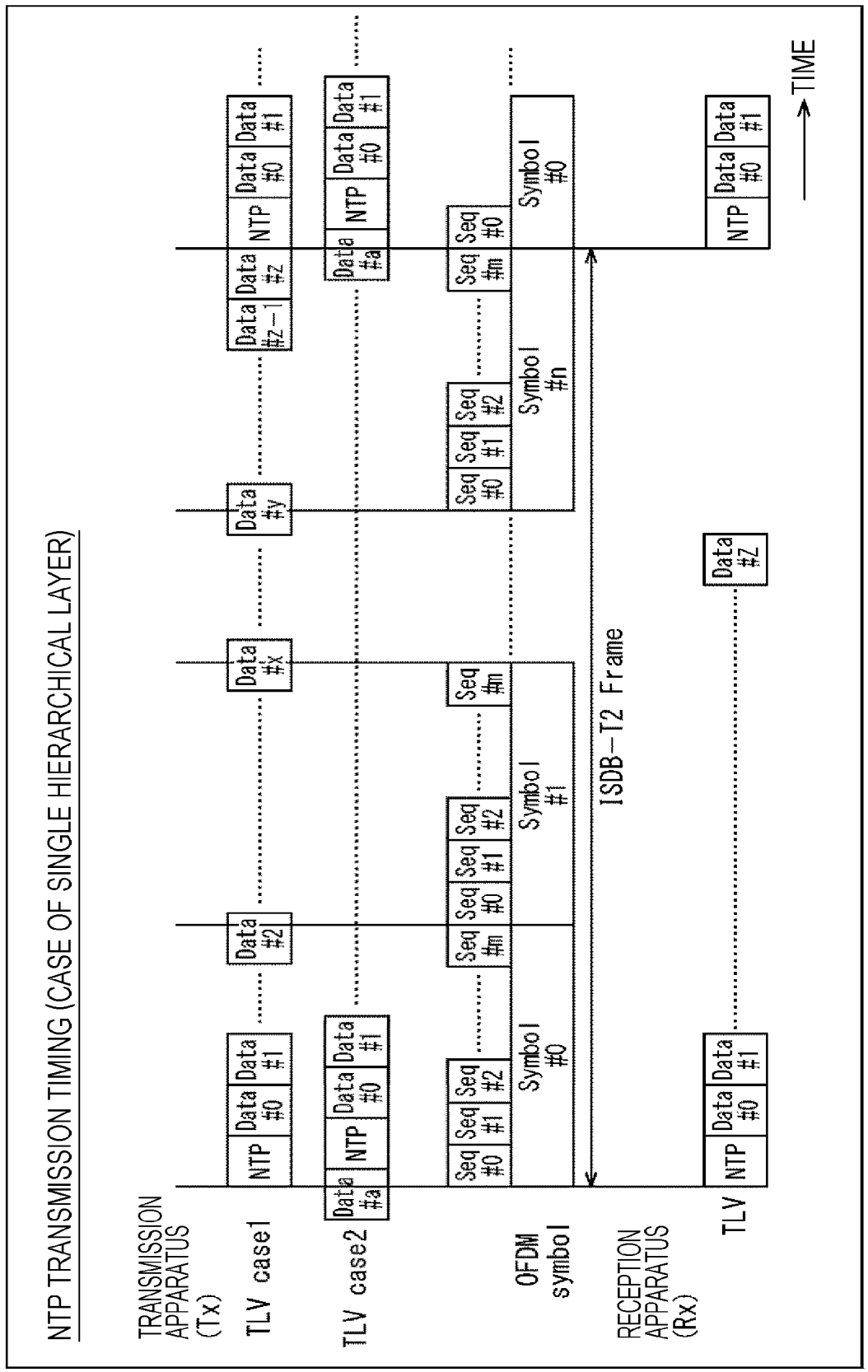
FIG. 10 is a diagram illustrating an example of transmission timings of time information in a case of a single hierarchical layer.

FIG. 10 is a diagram illustrating an example of the transmission timing of time information in the case of a single hierarchical layer.

FIG. 10 schematically illustrates data to be processed by the transmission apparatus 10 on the upper side of the figure, and schematically illustrates data processed by the reception apparatus 20 on the lower side of the figure. Furthermore, the horizontal direction in FIG. 10 represents time, the direction being directed from the left side to the right side in the drawing.

First, data processed by the transmission apparatus 10 will be described.

The transmission apparatus 10 performs necessary processing on the TLV packet to obtain an ISDB-T2 frame.

The TLV packet is a variable length packet, having a size of 4 to 65536 bytes, for example. The TLV packet is represented by "Data" in the figure. In addition, the NTP time information is represented by "NTP" in the figure.

An OFDM symbol is represented by "Symbol" in the figure. OFDM symbols, the number of which is n+1, namely, Symbol #0 to Symbol # n, constitute one ISDB-T2 frame. That is, this ISDB-T2 frame is a unit of transmitting data as a physical layer frame.

In a case where frequency division multiplexing (FDM) method is adopted as a method of multiplexing broadcast signals, however, the OFDM symbol is further divided into units of segments. Segments are denoted by "Seg" in the figure. Segments, the number of which is m+1, namely, Seg #0 to Seg # m, constitute one OFDM symbol.

Here, in the present technology, NTP time information is inserted so as to be at the head of the ISDB-T2 frame. The NTP time information includes the time at the head of the ISDB-T2 frame as the time information specified by the NTP.

TLV packet case 1 in FIG. 10 illustrates a case where a boundary of the ISDB-T2 frame and the boundary of the TLV packet are in alignment. In case 1, since the boundary of the ISDB-T2 frame and the boundary of the TLV packet are in alignment, it is possible to insert the NTP time information at the head (boundary) of the ISDB-T2 frame.

Furthermore, TLV packet case 2 in FIG. 10 illustrates a case where a boundary of the ISDB-T2 frame and the boundary of the TLV packet are not in alignment. In case 2, since the boundary of the ISDB-T2 frame and the boundary of the TLV packet are not in alignment, the head (boundary) of the ISDB-T2 frame comes in the middle of the TLV packet (for example, Data # a), and thus, NTP time information is inserted after the TLV packet.

In this manner, the transmission apparatus 10 has a configuration such that the NTP time information indicating the time at the head of the ISDB-T2 frame is inserted at the head of the ISDB-T2 frame, including a case where the boundary of the ISDB-T2 frame and the boundary of the TLV packet are in alignment and a case where these boundaries are not in alignment. In the case where the boundaries are not in alignment, the insertion position of the NTP time information is a position shifted from the boundary (position shifted by the TLV packet in the middle).

Next, data processed by the reception apparatus 20 will be described.

The reception apparatus 20 applies necessary processing to the ISDB-T2 frame to obtain a TLV packet. Here, a single ISDB-T2 frame can provide NTP time information arranged at the head of the frame, together with a plurality of TLV packets. This NTP time information indicates the time at the head of the ISDB-T2 frame.

In case 1 described above, the boundary of the ISDB-T2 frame and the boundary of the TLV packet are in alignment, enabling the reception apparatus 20 to refer to the time at the head of the ISDB-T2 frame indicated by the NTP time information inserted at the head of the ISDB-T2 frame so as to achieve clock recovery.

In contrast, in case 2 described above, the boundary of the ISDB-T2 frame and the boundary of the TLV packet are not in alignment, and thus, the insertion position of the NTP time information is shifted from the boundary of the ISDB-T2 frame, whereas the insertion timing of the NTP time information is constant on the transmission apparatus 10. Therefore, the reception apparatus 20 can perform clock recovery with reference to the time at the head of the ISDB-T2 frame indicated by the NTP time information, in accordance with the timing at which the NTP time information can be obtained from the ISDB-T2 frame.

In this manner, the reception apparatus 20 can perform clock recovery not only in TLV packet case 1 but also in TLV packet case 2 as long as the timing of the NTP time information obtained from the ISDB-T2 frame is ensured.

With this configuration, clock synchronization based on the NTP time information is achieved between the transmission apparatus 10 and the reception apparatus 20, enabling the reception apparatus 20 to process a plurality of TLV packets (Data #0 to Data # z) for each of the pieces of NTP time information included at the head of the ISDB-T2 frame.

As described above, with a configuration in which NTP time information indicating the time at the head of the ISDB-T2 frame is included at the head of the ISDB-T2 frame in the case of a single hierarchical layer, it is possible to transmit the time information efficiently with high accuracy, enabling the reception apparatus 20 to perform clock synchronization (clock recovery) using the NTP time information.

Furthermore, since PCR is used as time information in the MPEG2-TS system, and smoothing is indispensable, it has been only necessary to insert a PCR in a certain packet. The present technology, however, inserts NTP time information at the head of ISDB-T2 frame as illustrated in FIG. 10, thereby enabling handling the case of using TLV packet as a variable length packet even when the reception apparatus 20 side does not perform smoothing in units of TLV packet.

(B) Case of Plurality of Hierarchical Layers

Figure 11:
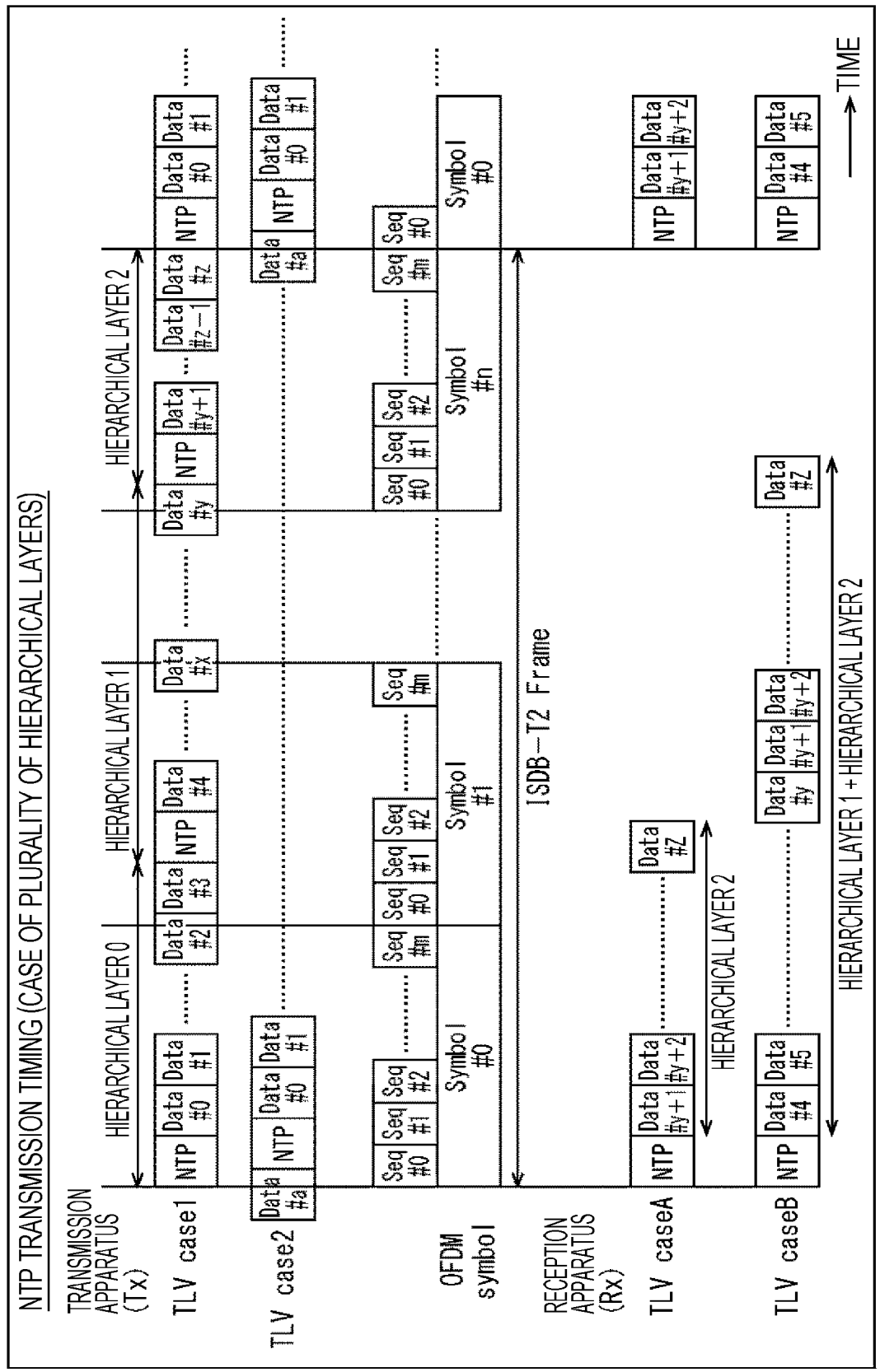
FIG. 11 is a diagram illustrating an example of transmission timings of time information in a case of a plurality of hierarchical layers.

FIG. 11 is a diagram illustrating an example of the time information transmission timing in the case of a plurality of hierarchical layers.

Similarly to the above-described FIG. 10, FIG. 11 schematically illustrates data to be processed by the transmission apparatus 10 on the upper side of the figure, and schematically illustrates data processed by the reception apparatus 20 on the lower side of the figure. In addition, in FIG. 11, the horizontal direction represents time in a similar manner.

First, data processed by the transmission apparatus 10 will be described.

As described above, n+1 OFDM symbols (namely, Symbol #0 to Symbol # n) constitute one ISDB-T2 frame. In addition, in a case where frequency division multiplexing (FDM) is adopted as a method of multiplexing broadcast signals, m+1 segments (namely, Seg #0 to Seg # m) constitute one OFDM symbol.

Here, in the present technology, NTP time information is inserted so as to be at the head of the ISDB-T2 frame. The NTP time information includes the time at the head of the ISDB-T2 frame as the information defined by the NTP.

TLV packet case 1 in FIG. 11 illustrates a case where a boundary of the ISDB-T2 frame and the boundary of the TLV packet are in alignment. In case 1, since the boundary of the ISDB-T2 frame and the boundary of the TLV packet are in alignment, the NTP time information is inserted at the head (boundary) of the ISDB-T2 frame.

Note that the example of FIG. 11 is a case of three hierarchical layers 0 to 2, and accordingly, one ISDB-T2 frame includes TLV packets for each of hierarchical layers 0 to 2.

Here, NTP time information indicating the time at the head of the ISDB-T2 frame is to be inserted for each of hierarchical layers 0 to 2. For example, for hierarchical layer 0, NTP time information is inserted at the head of a plurality of TLV packets (Data #0 to Data #3). Furthermore, NTP time information is inserted at the head of a plurality of TLV packets (Data #4 to Data # y) for hierarchical layer 1, while NTP time information is inserted at the head of a plurality of TLV packets (Data # y+1 to Data # z) for hierarchical layer 2.

Furthermore, TLV packet case 2 in FIG. 11 illustrates a case where the boundary of the ISDB-T2 frame and the boundary of the boundary of the TLV packet are not in alignment. In case 2, since the boundary of the ISDB-T2 frame and the boundary of the TLV packet are not in alignment, the head (boundary) of the ISDB-T2 frame comes in the middle of the TLV packet (for example, Data # a), and thus, NTP time information is inserted after the TLV packet.

Even in TLV packet case 2, NTP time information indicating the time at the head of the ISDB-T2 frame is inserted for each of pieces of data (plurality of TLV packets) of hierarchical layers 0 to 2, similarly to TLV packet case 1.

In this manner, the transmission apparatus 10 has a configuration such that the NTP time information indicating the time at the head of the ISDB-T2 frame is inserted at the head of the ISDB-T2 frame, including a case where the boundary of the ISDB-T2 frame and the boundary of the TLV packet are in alignment and a case where these boundaries are not in alignment. In the case where the boundaries are not in alignment, the insertion position of the NTP time information is a position shifted from the boundary (position shifted by the TLV packet in the middle).

Furthermore, in the case of plurality of hierarchical layers, NTP time information indicating the time at the head of the ISDB-T2 frame is inserted at the head of the data unit of each of the hierarchical layers.

Next, data processed by the reception apparatus 20 will be described.

As described above, a single ISDB-T2 frame can provide NTP time information arranged at the head of data (plurality of TLV packets) of each of the hierarchical layers, together with a plurality of TLV packets. This NTP time information indicates the time at the head of the ISDB-T2 frame. In other words, in the case of a plurality of hierarchical layers, since NTP time information indicating the time at the head of the ISDB-T2 frame is inserted at the head of the data of each of the hierarchical layers, NTP time information is obtained for each of the hierarchical layers.

For example, FIG. 11 illustrates, as TLV packet case A, a case where the hierarchical layer 2 alone has been selected from the three hierarchical layers, namely, hierarchical layer 0 to hierarchical layer 2.

In case A, the NTP time information is inserted at the head of the data of the hierarchical layer 2 when the boundary of the ISDB-T2 frame and the boundary of the TLV packet are in alignment in the case 1 described above. Accordingly, the reception apparatus 20 can perform clock recovery with reference to the time at the head of the ISDB-T2 frame indicated by the NTP time information inserted at the head of data of the hierarchical layer 2.

In contrast, in case A, the insertion position of the NTP time information is shifted from the boundary of the ISDB-T2 frame when the boundary of the ISDB-T2 frame and the boundary of the TLV packet are not in alignment in case 2 described above, whereas the insertion timing of the NTP time information into the head of data of the hierarchical layer 2 is constant on the transmission apparatus 10. Therefore, the reception apparatus 20 can perform clock recovery with reference to the time at the head of the ISDB-T2 frame indicated by the NTP time information, in accordance with the timing at which the NTP time information of the hierarchical layer 2 is obtained from the ISDB-T2 frame.

Furthermore, for example, FIG. 11 illustrates, as TLV packet case B, a case where the hierarchical layer 1 and the hierarchical layer 2 have been selected from among the three hierarchical layers, namely, hierarchical layer 0 to hierarchical layer 2.

In case B, the NTP time information is inserted at the head of the data of the hierarchical layer 1 when the boundary of the ISDB-T2 frame and the boundary of the TLV packet are in alignment in the case 1 described above. Accordingly, the reception apparatus 20 can perform clock recovery with reference to the time at the head of the ISDB-T2 frame indicated by the NTP time information inserted at the head of data of the hierarchical layer 1.

In contrast, in case B, the insertion position of the NTP time information is shifted from the boundary of the ISDB-T2 frame when the boundary of the ISDB-T2 frame and the boundary of the TLV packet are not in alignment in case 2 described above, whereas the insertion timing of the NTP time information into the head of data of the hierarchical layer 1 is fixed on the transmission apparatus 10. Therefore, the reception apparatus 20 can perform clock recovery with reference to the time at the head of the ISDB-T2 frame indicated by the NTP time information, in accordance with the timing at which the NTP time information of the hierarchical layer 1 is obtained from the ISDB-T2 frame.

Note that case A and case B of the TLV packet described here are mere examples and, for example, even in a case where all hierarchical layers 0 to 2 are selected, etc., it is still possible to perform clock recovery in a similar manner with reference to the head time of the ISDB-T2 frame indicated by the NTP time information, inserted for each of the hierarchical layers.

In this manner, the reception apparatus 20 can perform clock recovery not only in the single hierarchical layer illustrated in FIG. 10 but also in a plurality of hierarchical layers illustrated in FIG. 11 as long as the timing of the NTP time information obtained from the ISDB-T2 frame is ensured.

With this configuration, clock synchronization based on the NTP time information is achieved between the transmission apparatus 10 and the reception apparatus 20, enabling the reception apparatus 20 to process a plurality of TLV packets for each of the pieces of NTP time information included at the head of data of each of the hierarchical layers.

As described above, with a configuration in which NTP time information indicating the time at the head of the ISDB-T2 frame is included at the head of data of each of the hierarchical layers (plurality of TLV packets) of the ISDB-T2 frame in the case of plurality of hierarchical layers, it is possible to transmit the time information efficiently with high accuracy, enabling the reception apparatus 20 to perform clock synchronization (clock recovery) using the NTP time information for each of the hierarchical layers.

Furthermore, since PCR is used as time information in the MPEG2-TS system, and smoothing is indispensable, it is only necessary to insert a PCR in a certain packet. The present technology, however, inserts NTP time information at the head of data of each of the hierarchical layers of the ISDB-T2 frame as illustrated in FIG. 11, thereby enabling handling the case of using TLV packet as a variable length packet even when the reception apparatus 20 side does not perform smoothing in units of TLV packet.

In the case of the example of FIG. 11 in particular, it would be more difficult to perform smoothing since not only the TLV packet has a variable length but also a plurality of hierarchical layers is used. The present technology, however, can handle the processing even in a case where smoothing is not performed, making it possible to handle the processing even when the plurality of hierarchical layers is adopted.

<4. Syntax of Time Information of the Present Technology>

Meanwhile, transmission multiplexing configuration control (TMCC) is scheduled to be defined in ISDB-T2 as new control information similarly to the current ISDB-T. TMCC is transmission control information used in execution of demodulation processing, decoding processing, or the like, in the reception apparatus 20 in transmission using hierarchical layers, in which a plurality of transmission parameters is mixed.

In addition, while the above description is a case where the NTP time information indicating the time at the head of the ISDB-T2 frame is inserted at the head of the ISDB-T2 frame, it is also allowable to include the time information defined by the NTP in the transmission control information (TMCC). Hereinafter, a case where NTP time information is included in transmission control information (TMCC) in transmission will be described.

(Syntax of NTP Time Information)

FIG. 12 is a diagram illustrating an example of syntax of NTP time information.

As 1-bit NTP_FLAG, a flag indicating that NTP time information is included is used. For example, setting of "0" as NTP_FLAG indicates that NTP time information is not included, while setting of "1" indicates that NTP time information is included.

For example, since the setting of "1" as NTP_FLAG indicates that NTP time information is included, leap_indicator and transmit_timestamp are arranged as the NTP time information.

With 2-bit leap_indicator, it is indicated that leap second is to be inserted or deleted to/from the last minute of the current month.

The leap second is the second which is added or deleted in Coordinated Universal Time (UTC) to adjust the difference with UT1 of the universal time. Since NTP transmits and receives time using Coordinated Universal Time (UTC), it is necessary to adjust the leap second.

With 64-bit transmit_timestamp, time information defined by the NTP and the time of the server in the NTP length format are indicated. Note that the format of NTP is specified by Request for Comments (RFC) by Internet Engineering Task Force (IETF).

Such NTP time information is included in the transmission control information (TMCC).

Note that, as described above with reference to FIG. 10 and FIG. 11, in a case where NTP time information is inserted at the head of the ISDB-T2 frame, the NTP time information indicated in FIG. 12 may be or need not be included in the transmission control information (TMCC).

In other words, there are the following three patterns in methods of transmitting time information (NTP time information) according to the present technology. The first pattern is a case where NTP time information is inserted at the head of the ISDB-T2 frame and NTP time information is also included in the transmission control information (TMCC). The second pattern is a case where the NTP time information is inserted at the head of the ISDB-T2 frame, but the NTP time information is not included in the transmission control information (TMCC). The third pattern is a case where the NTP time information is not inserted at the head of ISDB-T2 frame, but NTP time information is included in transmission control information (TMCC).

Here, the NTP time information is indispensable information in a case where operation of constantly inserting the NTP time information at the head of the ISDB-T2 frame is performed. Accordingly, whether to describe NTP_FLAG illustrated in FIG. 12 is optional in the transmission control information (TMCC).

Note that in a case where unsigned integer most significant bit first (uimsbf) is designated as Mnemonic in FIG. 12, this means that the value is treated as an integer by bit operation. Furthermore, in a case where bit string, left bit first (bslbf) is designated, this means that the value is treated as a bit string.

<5. Flow of Time Synchronization Processing>

Next, a flow of time synchronization processing (clock synchronization) on the transmitting side and the receiving side using the time information according to the present technology will be described with reference to the flowchart information FIG. 13.

Figure 13:
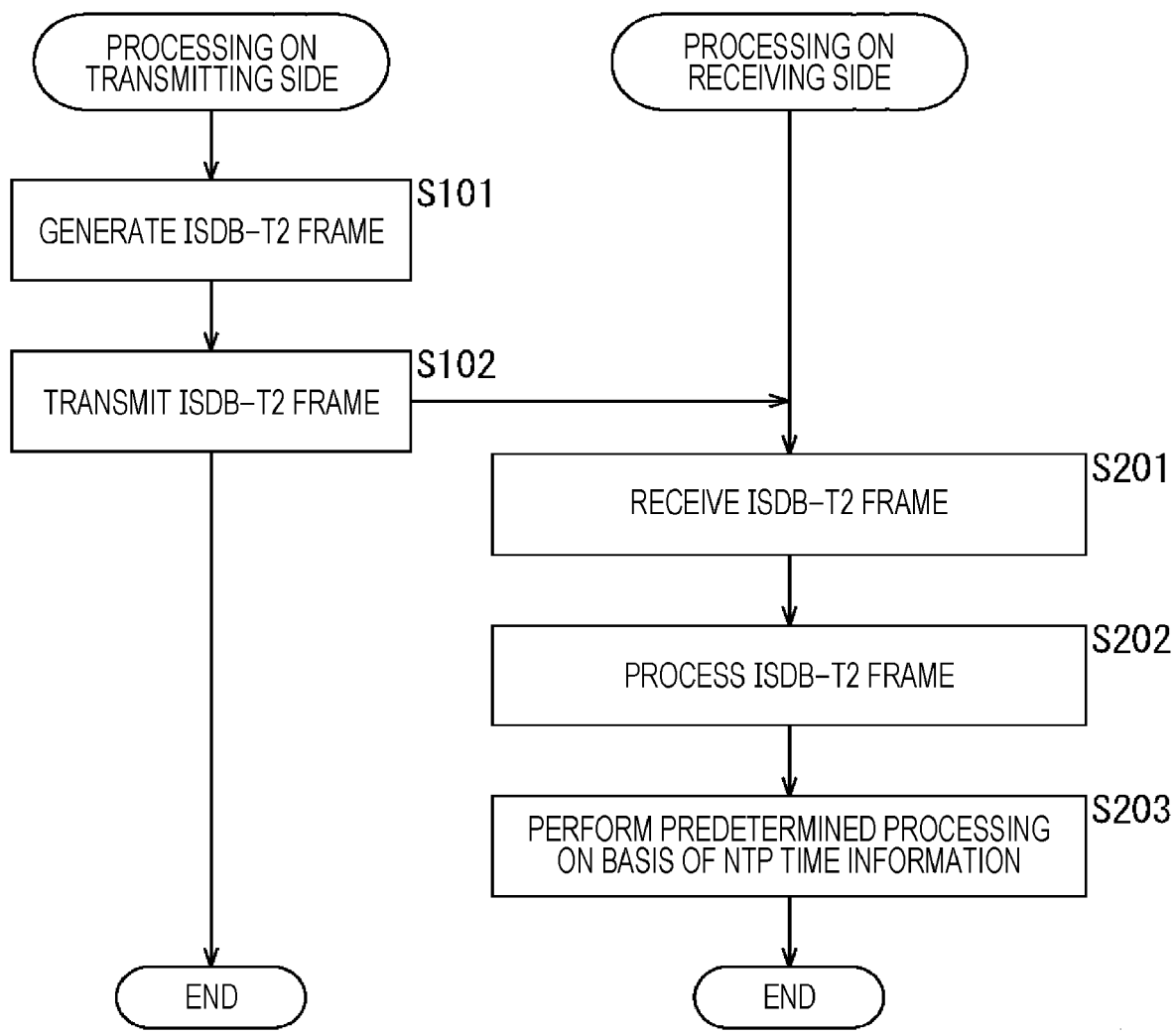
FIG. 13 is a flowchart illustrating a flow of time synchronization processing.

Note that processing of steps S101 to S102 in FIG. 13 is processing executed on the transmitting side by the transmission apparatus 10 in FIG. 1. Furthermore, the processing in steps S201 to S203 is processing executed on the receiving side by the reception apparatus 20 in FIG. 1.

In step S101, the frame generation unit 113 generates an ISDB-T2 frame. Here, NTP time information indicating the time at the head of the ISDB-T2 frame is to be included at the head of the ISDB-T2 frame. At this time, there is also a case where the boundary of the ISDB-T2 frame and the boundary of the TLV packet are not in alignment in addition to the case where the boundary of the ISDB-T2 and the boundary of the TLV packet are in alignment.

In other words, in the case of the single hierarchical layer illustrated in FIG. 10 described above, one ISDB-T2 frame includes a plurality of TLV packets for a single hierarchical layer, and NTP time information is inserted at the head of the plurality of TLV packets. Furthermore, in the case of the plurality of hierarchical layers illustrated in FIG. 11 described above, one ISDB-T2 frame includes a plurality of TLV packets for each of the plurality of hierarchical layers, and NTP time information is inserted at the head of the plurality of TLV packets for each of the plurality of hierarchical layers.

In step S102, the modulation unit 114 performs necessary processing on the ISDB-T2 frame generated in the processing in step S101, and transmits a resultant broadcast signal (ISDB-T2 frame) via the antenna 121.

In step S201, the RF unit 211 receives the broadcast signal (ISDB-T2 frame) transmitted from the transmission apparatus 10 via the antenna 221.

In step S202, the demodulation unit 212 processes the ISDB-T2 frame obtained from a broadcast signal received in the processing of step S201. The NTP time information indicating the time at the head of the ISDB-T2 frame and a TLV packet are obtained from the ISDB-T2 frame through the processing of this ISDB-T2 frame, and then, the NTP time information and the TLV packet thus obtained are sequentially output from the demodulation unit 212 to the processing unit 213.

In step S203, the processing unit 213 performs predetermined processing on the basis of the NTP time information obtained in the processing of step S202. Here, the processing unit 213 refers to the time at the head of the ISDB-T2 frame indicated by the NTP time information among the data sequentially output from the demodulation unit 212 to the processing unit 213, enabling performing clock synchronization (clock recovery).

In other words, in the case of the single hierarchical layer illustrated in FIG. 10 described above, the demodulation unit 212 performs demodulation processing to obtain NTP time information indicating the time at the head of the ISDB-T2 frame, inserted at the head of the frame, from one ISDB-T2 frame, together with a plurality of TLV packets. Thereafter, the demodulation unit 212 sequentially outputs the NTP time information and the TLV packet obtained in the demodulation processing to the processing unit 213. With this operation, the processing unit 213 can perform clock recovery with reference to the time of the head of the ISDB-T2 frame, indicated by the NTP time information output from the demodulation unit 212 at a constant timing.

Furthermore, in the case of the plurality of hierarchical layers illustrated in FIG. 11, the NTP time information indicating the time at the head of the ISDB-T2 frame is inserted at the head of the data (plurality of TLV packets) of each of the hierarchical layers, and thus, the demodulation unit 212 can obtain NTP time information for each of hierarchical layers from one ISDB-T2 frame by demodulation processing. The demodulation unit 212 sequentially outputs the NTP time information and the TLV packet obtained in the demodulation processing to the processing unit 213. With this operation, the processing unit 213 can perform clock recovery with reference to the time of the head of the ISDB-T2 frame, indicated by the NTP time information inserted for each of the hierarchical layers, output from the demodulation unit 212 at a constant timing.

The flow of time synchronization processing has been described above.

<6. Modification>

While the above description is a case where time information defined by NTP is used as the time information, the present invention is not limited to this example and may also use, for example, time information defined by Precision Time Protocol (PTP) or Third Generation Partnership Project (3GPP), time information included in global positioning system (GPS) information, or information of a certain time, such as time information of a format uniquely determined.

Furthermore, while the time information in the above description indicates the time at the head of the physical layer frame, the time information may be configured to indicate any time. For example, the time information may represent a time (absolute time) at a predetermined position in the stream of a physical layer frame. That is, the time at the predetermined position in a stream is the time at the predetermined timing during the processing of the bit at the predetermined position by the transmission apparatus 10. Furthermore, in a case where a structure in which a preamble is provided in a physical layer frame is adopted, time information may be included in the preamble.

While the above description is an example using Integrated Services Digital Broadcasting (ISDB), which is a system adopted in Japan and other countries as a standard for digital television broadcasting, the present technology may be applied to Advanced Television Systems Committee (ATSC) adopted by United States and other countries, or Digital Video Broadcasting (DVB) adopted by European countries and other countries, or the like.

In other words, while ATSC and DVB adopt time division multiplexing (TDM) instead of frequency division multiplexing (FDM) method as a method of multiplexing broadcast signals, the present technology can be applied also to a case where this time division multiplexing (TDM) is adopted. Furthermore, the above-described hierarchical layer can conceptually be regarded as a physical layer pipe (PLP). In this case, the plurality of hierarchical layers can also be defined as multiple-PLP (M-PLP).

Furthermore, the present technology can be applied to standards of digital television broadcasting represented by terrestrial broadcast, and other standards such as satellite broadcasting using a broadcasting satellite (BS) and a communications satellite (CS), and cable broadcast such as cable television (CATV).

Furthermore, the terms of packets, frames, control information, or the like are merely examples, and other terms may be used in some cases. The difference between these names, however, is just a difference in formality, and there is no substantial difference in the packets, frames, control information, or the like, as a target. For example, the TLV packet may also be referred to as an ATSC Link-layer Protocol (ALP) packet, Generic packet, or the like in some cases. Furthermore, frames and packets may be used interchangeably in some cases.

In addition, the present technology is also applicable to, for example, a predetermined standard (standards other than standards for digital television broadcasting) or the like defined on the assumption of using, as a transmission line, a transmission line other than the broadcasting network, that is, a communication line (communication network) such as the Internet and a telephone network, or the like. In that case, a communication line such as the Internet or a telephone network is used as the transmission line 30 of the transmission system 1 (FIG. 1), and the transmission apparatus 10 can be used as a server provided on the Internet. Then, the communication server and the reception apparatus 20 perform bidirectional communication via the transmission line 30 (communication line).

<7. Computer Configuration>

A series of processing described above can be executed in hardware or with software. In a case where the series of processing is executed with software, a program included in the software is installed in a computer. FIG. 14 is a diagram illustrating an exemplary configuration of hardware of a computer that executes the series of processing described above by a program.

In a computer 1000, a central processing unit (CPU) 1001, a read only memory (ROM) 1002, a random access memory (RAM) 1003 are interconnected via a bus 1004. The bus 1004 is further connected with an input/output interface

1005. The input/output interface 1005 is connected with an input unit 1006, an output unit 1007, a recording unit 1008, a communication unit 1009, and a drive 1010.

The input unit 1006 includes a key board, a mouse, a microphone, or the like. The output unit 1007 includes a display, a speaker, or the like. The recording unit 1008 includes a hard disk, a non-volatile memory, or the like. The communication unit 1009 includes a network interface or the like. The drive 1010 drives a removable recording medium 1011 such as a magnetic disk, an optical disk, a magneto-optical disk, and a semiconductor memory.

On the computer 1000 configured as above, the series of above-described processing is executed by operation such that the CPU 1001 loads, for example, a program stored in the ROM 1002 and the recording unit 1008 onto the RAM 1003 via the input/output interface 1005 and the bus 1004 and executes the program.

The program executed by the computer 1000 (CPU 1001) can be stored, for example, in the removable recording medium 1011 as a package medium or the like and be provided. Alternatively, the program can be provided via a wired or wireless transmission medium including a local area network, the Internet, and digital satellite broadcasting.

On the computer 1000, the program can be installed in the recording unit 1008 via the input/output interface 1005, by attaching the removable recording medium 1011 to the drive 1010. In addition, the program can be received at the communication unit 1009 via a wired or wireless transmission medium and be installed in the recording unit 1008. Alternatively, the program can be installed in the ROM 1002 or the recording unit 1008 beforehand.

Here, in this description, processing executed by a computer in accordance with a program need not be performed in time series in the order described in the flowchart. That is, processing executed by the computer according to the program includes processing executed in parallel or separately (e.g. parallel processing, or object processing). In addition, the program may be processed by one computer (processor) or may be processed with distributed processing by a plurality of computers.

Note that embodiments of the present technology are not limited to the above-described embodiments but can be modified in a variety of ways within a scope of the present technology.

In addition, the present technology can be configured as follows.

(1)

A transmission apparatus including:

a generation unit that generates a physical layer frame; and a transmission unit that transmits the physical layer frame, in which time information indicating a certain time is included at a head of the physical layer frame.

(2)

The transmission apparatus according to (1), in which the transmission unit transmits a broadcast signal including the physical layer frame by using a frequency division multiplexing (FDM) method.

(3)

The transmission apparatus according to (2), in which a boundary of the physical layer frame and a boundary of a packet included in the physical layer frame are in alignment.

(4)

The transmission apparatus according to (2), in which a boundary of the physical layer frame and a boundary of a packet included in the physical layer frame are not in alignment.

(5)

The transmission apparatus according to (2), in which the physical layer frame includes data of a single hierarchical layer, and the time information is included at a head of the data of the single hierarchical layer.

(6)

The transmission apparatus according to (2), in which the physical layer frame includes data of a plurality of hierarchical layers, and the time information is included at a head of each of the data of the plurality of hierarchical layers.

(7)

The transmission apparatus according to any of (1) to (6), in which transmission control information included in the physical layer frame includes the time information.

(8)

The transmission apparatus according to any of (1) to (7), in which the time information is time information defined by network time protocol (NTP), and the time information indicates time at the head of the physical layer frame.

(9)

A data processing method corresponding to a transmission apparatus, the method including steps of:

generating a physical layer frame; and transmitting the physical layer frame, by using the transmission apparatus, in which time information indicating a certain time is included at a head of the physical layer frame.

(10)

A reception apparatus including:

a reception unit that receives a physical layer frame including time information; and a processing unit that performs predetermined processing on the basis of the time information, in which the time information indicating a certain time is included at a head of the physical layer frame.

(11)

The reception apparatus according to (10), in which the reception unit receives a broadcast signal including the physical layer frame, transmitted by using a frequency division multiplexing (FDM) method.

(12)

The reception apparatus according to (11), in which the processing unit performs clock synchronization on the basis of the time information.

(13)

The reception apparatus according to (12), in which a boundary of the physical layer frame and a boundary of a packet included in the physical layer frame are in alignment.

(14)

The reception apparatus according to (12), in which a boundary of the physical layer frame and a boundary of a packet included in the physical layer frame are not in alignment.

(15)

The reception apparatus according to (12), in which the physical layer frame includes data of a single hierarchical layer, and the time information is included at a head of the data of the single hierarchical layer.

(16)
The reception apparatus according to (12),
in which the physical layer frame includes data of a plurality of hierarchical layers, and
the time information is included at a head of each of the data of the plurality of hierarchical layers.

(17)
The reception apparatus according to any of (10) to (16),
in which transmission control information included in the physical layer frame includes the time information.

(18)
The reception apparatus according to any of (10) to (17),
in which the time information is time information defined by NTP, and
the time information indicates time at the head of the physical layer frame.

(19)
A data processing method corresponding to a reception apparatus, the method including steps of:
receiving a physical layer frame including time information; and
performing predetermined processing on the basis of the time information,
by using the reception apparatus,
in which the time information indicating a certain time is included at a head of the physical layer frame.

REFERENCE SIGNS LIST

1 Transmission system
10 Transmission apparatus
20 Reception apparatus
30 Transmission line
111 Packet processing unit
112 Control information generation unit
113 Frame generation unit
114 Modulation unit
211 RF unit
212 Demodulation unit
213 Processing unit
1000 Computer
1001 CPU

The invention claimed is:

1. A transmission apparatus comprising:
processing circuitry configured to generate a physical layer frame that includes time information at a head portion of the physical layer frame; and
transmission circuitry configured to transmit the physical layer frame according to frequency division multiplexing (FDM) in a frequency band, the frequency band including frequency segments that are arranged into one or more hierarchies,
wherein the time information indicates a time corresponding to a start position of the physical layer frame.

2. The transmission apparatus according to claim 1, wherein
a boundary of the physical layer frame and a boundary of a packet included in the physical layer frame are in alignment.

3. The transmission apparatus according to claim 1, wherein
a boundary of the physical layer frame and a boundary of a packet included in the physical layer frame are not in alignment.

4. The transmission apparatus according to claim 1, wherein
the physical layer frame includes data over a single hierarchical layer, and
the time information is included at a head portion of the data over the single hierarchical layer.

5. The transmission apparatus according to claim 1, wherein
the physical layer frame includes data over a plurality of hierarchical layers, and
the time information is included at head portions of the data over the hierarchical layers, respectively.

6. The transmission apparatus according to claim 1, wherein
the physical layer frame includes transmission control information, and
the transmission control information includes the time information.

7. The transmission apparatus according to claim 1, wherein
the time information is time information defined by network time protocol (NTP).

8. A data processing method, comprising:
generating, by processing circuitry of a transmission apparatus, a physical layer frame that includes time information at a head portion of the physical layer frame; and
transmitting, by transmission circuitry of the transmission apparatus, the physical layer frame according to frequency division multiplexing (FDM) in a frequency band, the frequency band including frequency segments that are arranged into one or more hierarchies,
wherein the time information indicates a time corresponding to a start position the physical layer frame.

9. A reception apparatus comprising:
reception circuitry configured to receive a physical layer frame that is transmitted according to frequency division multiplexing (FDM) in a frequency band, the frequency band including frequency segments that are arranged into one or more hierarchies; and
processing circuitry configured to
obtain time information from a head portion of the physical layer frame, the time information indicating a time corresponding to a start position of the physical layer frame, and
perform predetermined processing on the basis of the time information.

10. The reception apparatus according to claim 9, wherein
the processing circuitry is configured to perform clock synchronization on the basis of the time information.

11. The reception apparatus according to claim 10, wherein
a boundary of the physical layer frame and a boundary of a packet included in the physical layer frame are in alignment.

12. The reception apparatus according to claim 10, wherein
a boundary of the physical layer frame and a boundary of a packet included in the physical layer frame are not in alignment.

13. The reception apparatus according to claim 10, wherein
the physical layer frame includes data over a single hierarchical layer, and
the time information is included at a head portion of the data over the single hierarchical layer.

14. The reception apparatus according to claim 10, wherein
   the physical layer frame includes data over a plurality of hierarchical layers, and
   the time information is included at head portions of the data over the hierarchical layers, respectively.

15. The reception apparatus according to claim 10, wherein
   the physical layer frame includes transmission control information, and
   the transmission control information includes the time information.

16. The reception apparatus according to claim 10, wherein
   the time information is time information defined by NTP.

17. A data processing method, comprising:
   receiving, by reception circuitry of a reception apparatus, a physical layer frame that is transmitted according to frequency division multiplexing (FDM) in a frequency band, the frequency band including frequency segments that are arranged into one or more hierarchies;
   obtaining, by processing circuitry of the reception apparatus, time information from a head portion of the physical layer frame, the time information indicating a time corresponding to a start position of the physical layer frame; and
   performing, by the processing circuitry of the reception apparatus, predetermined processing on the basis of the time information.

* * * * *